United States Patent
Gachot et al.

[15] 3,690,733
[45] Sept. 12, 1972

[54] COMPRESSED-AIR BRAKING AND LOCKING SYSTEM FOR TRAILERS OR SEMITRAILERS

[72] Inventors: Jean Gachot, 179 Avenue de la Divison Leclere, 95 Enghien; Fernand Perales, 87 Avenue A.G. Belin, 95 Argenteuil, both of France

[22] Filed: Dec. 7, 1970

[21] Appl. No.: 95,684

[30] Foreign Application Priority Data
Dec. 9, 1969   France................6942493
Aug. 7, 1970   France................7029170
Sept. 30, 1970  France................7035370
Oct. 13, 1970  France................7036857

[52] U.S. Cl.........................................303/7, 303/29
[51] Int. Cl............................................B60t 13/00
[58] Field of Search................303/7, 8, 9, 18, 29, 40

[56] References Cited

UNITED STATES PATENTS 3,304,131   2/1967   Bueler....................303/29
3,085,833   4/1963   Schultz....................303/29

Primary Examiner—Evon C. Blunk
Assistant Examiner—Hadd S. Lane
Attorney—Young & Thompson

[57] ABSTRACT

A compressed-air braking and brakes locking system for trailers is provided, which permits to release the trailer brakes and to apply and lock the trailer brakes again when the trailer is separated from its tractor. The system includes a compressed air reservoir and an emergency relay valve on the trailer and a hand operated valve so arranged to put the control inlets of the emergency relay valve and of the brake unlocking device selectively in communication with the control circuits of the tractor or with the reservoir of the trailer.

19 Claims, 27 Drawing Figures

Patented Sept. 12, 1972

INVENTORS
JEAN GACHOT
FERNAND PERALES
By Young & Thompson
ATTYS.

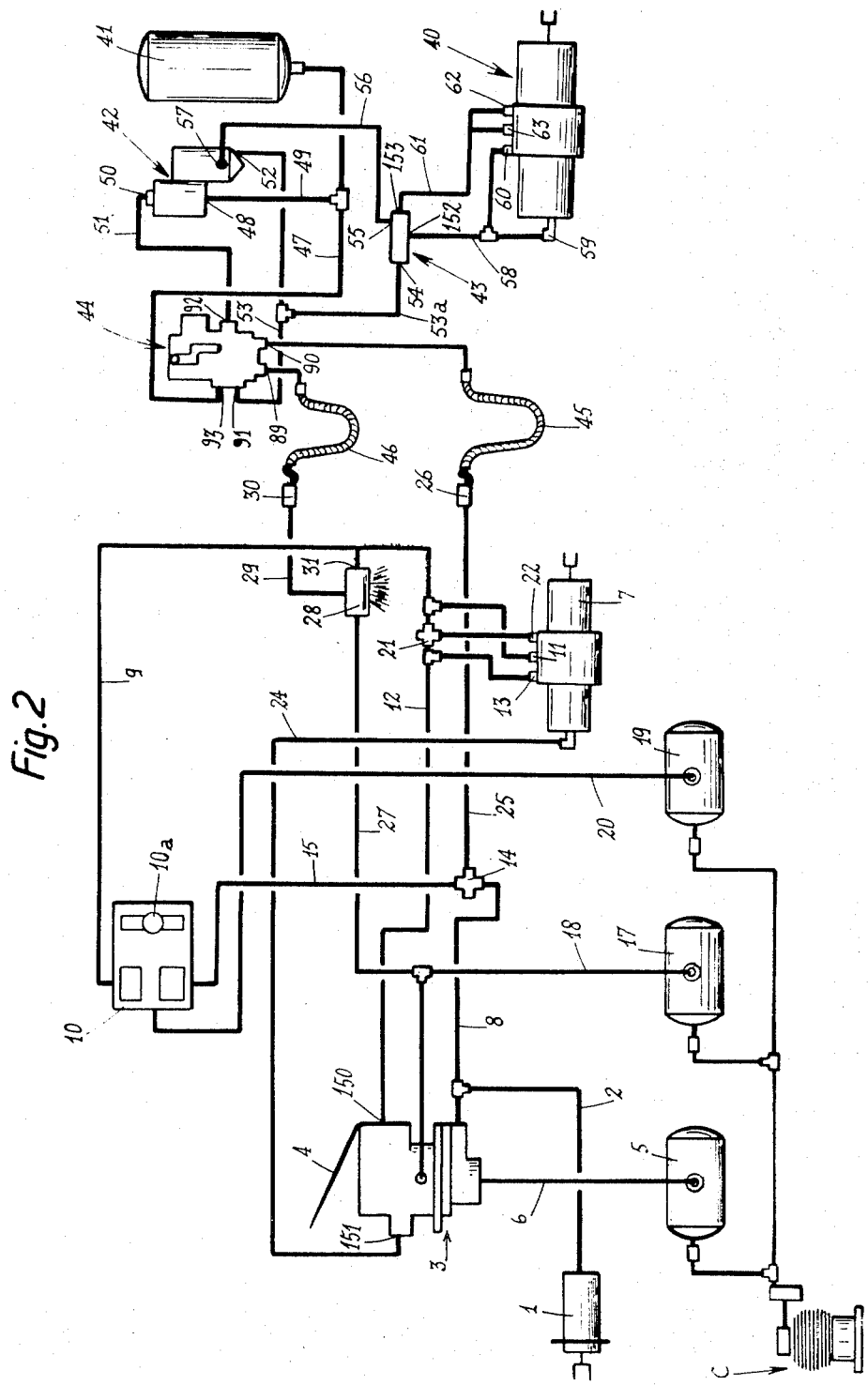

INVENTOR
JEAN GACHOT
FERNAND PERALES
By Young & Thompson
ATTYS.

Patented Sept. 12, 1972

INVENTOR
JEAN GACHOT
FERNAND PERALES
BY Young & Thompson
ATTYS.

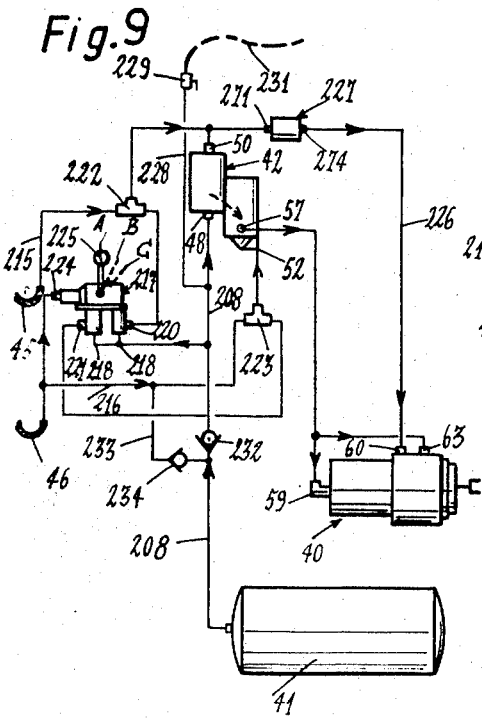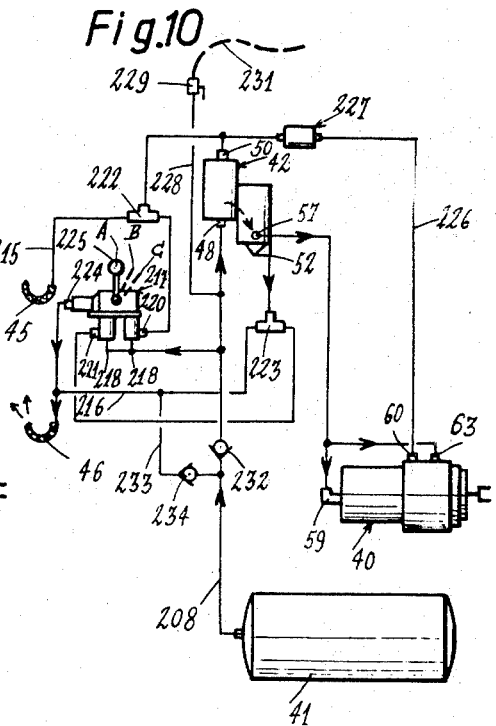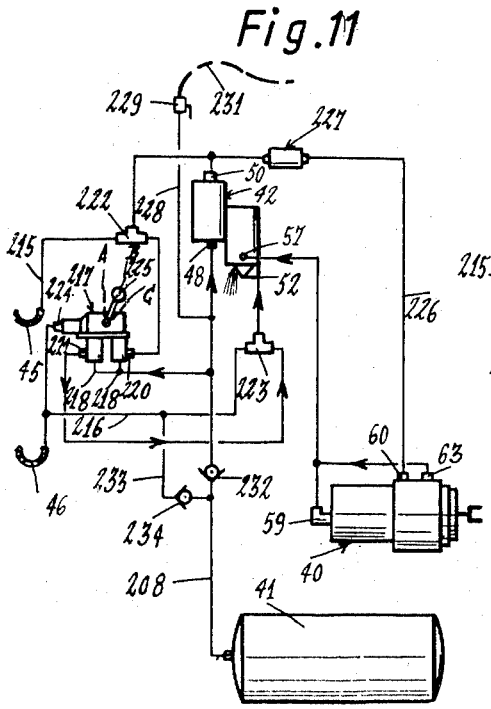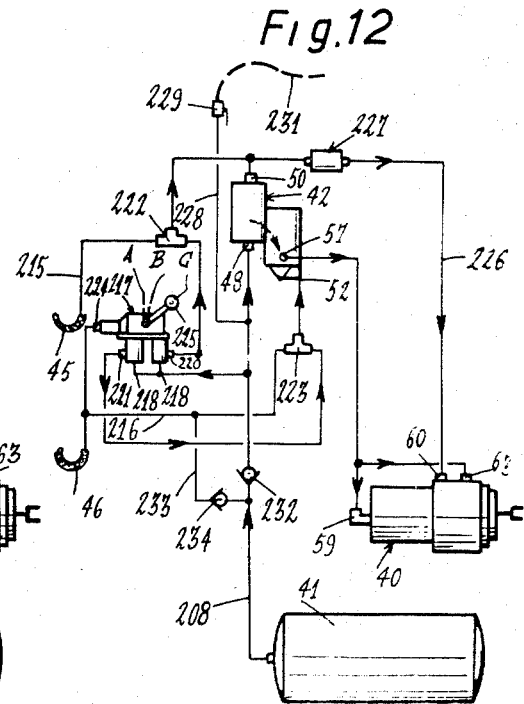

Patented Sept. 12, 1972
3,690,733
11 Sheets-Sheet 6
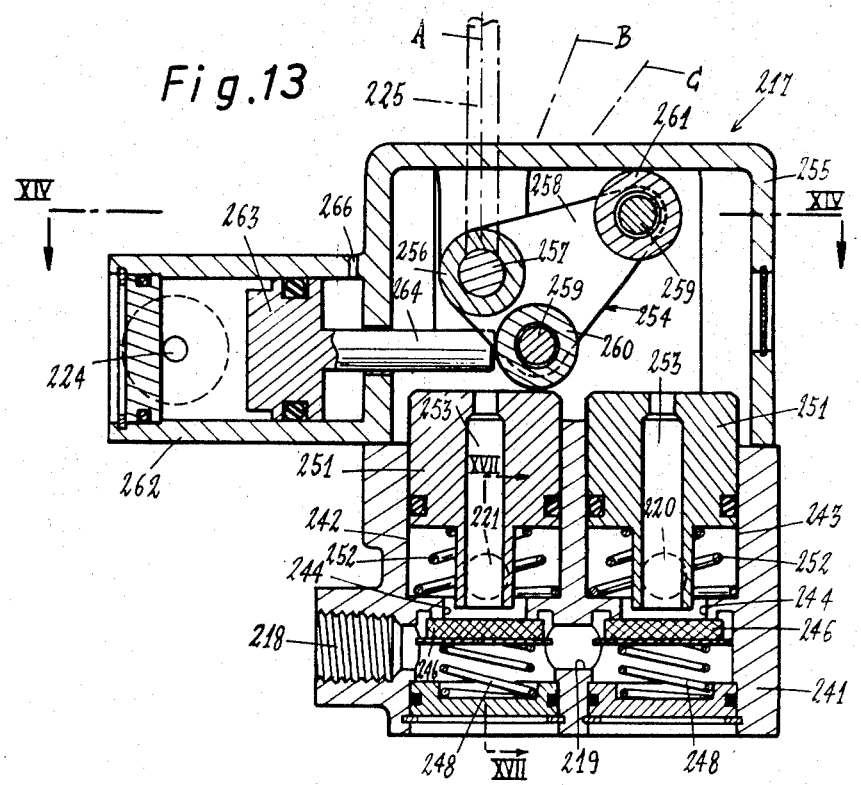
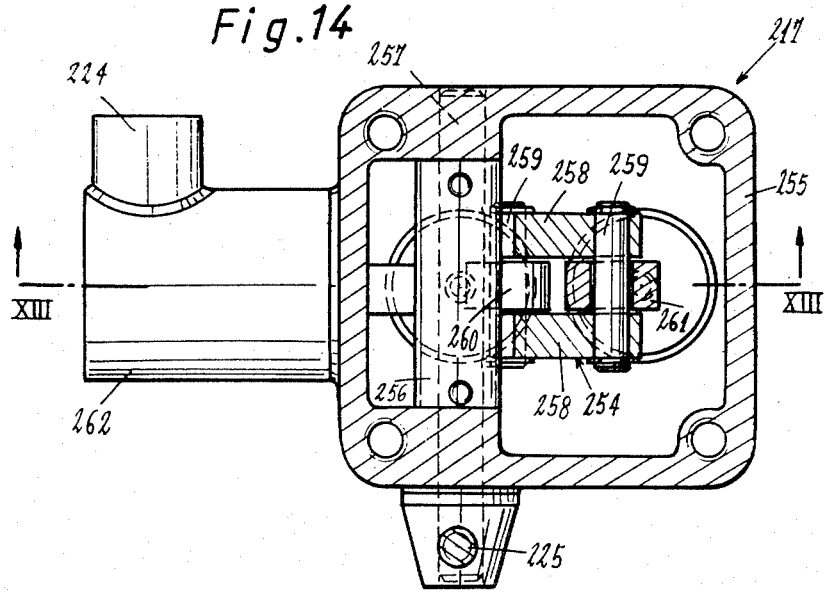
INVENTORS:
JEAN GACHOT
FERNAND PERALES
By Young & Thompson
ATTYS.

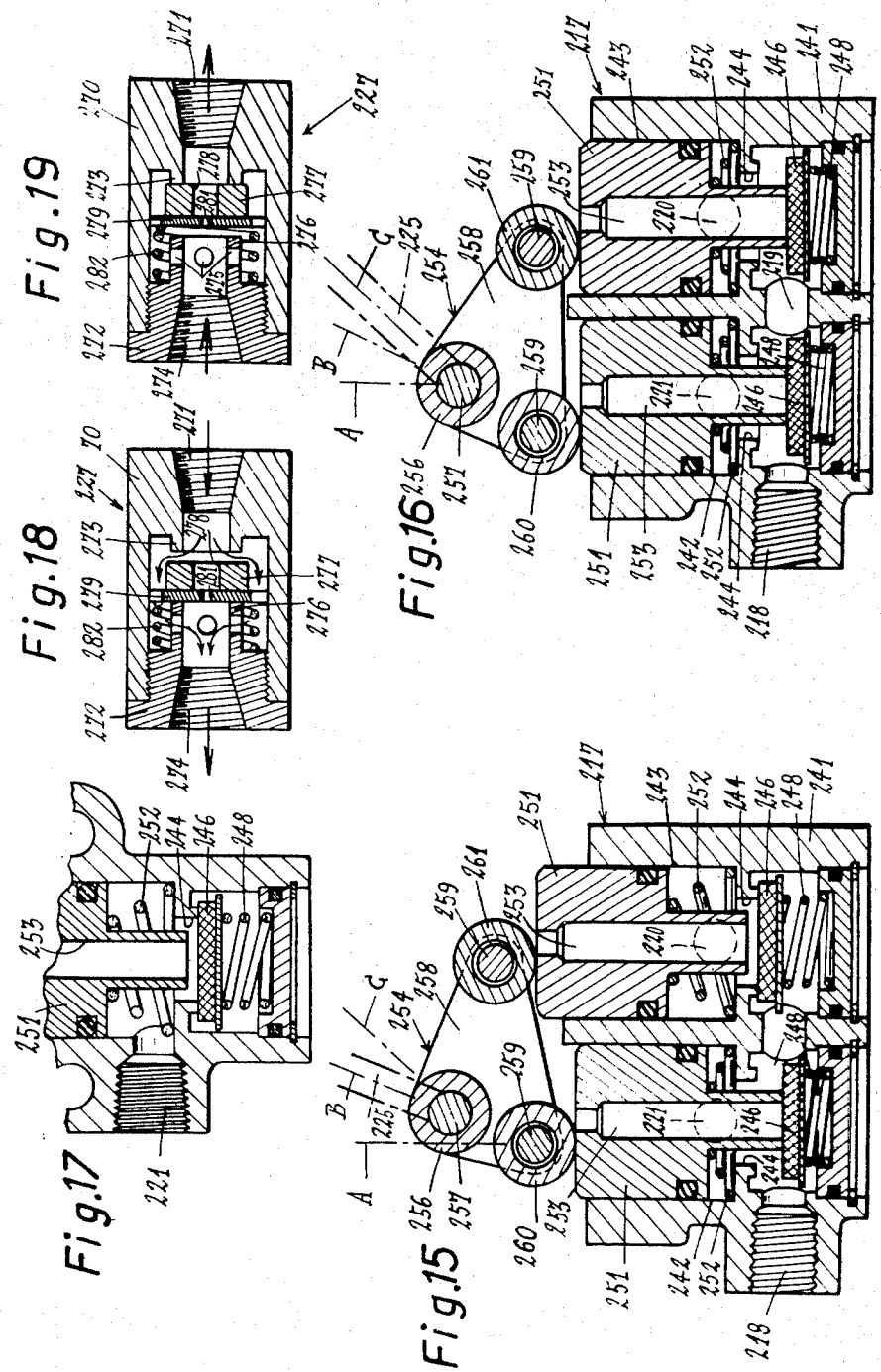

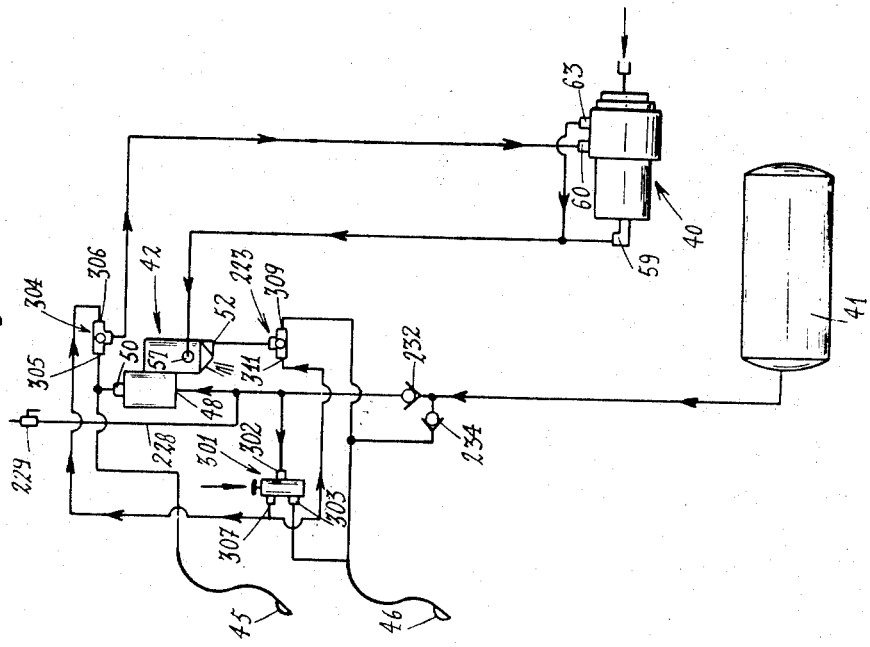
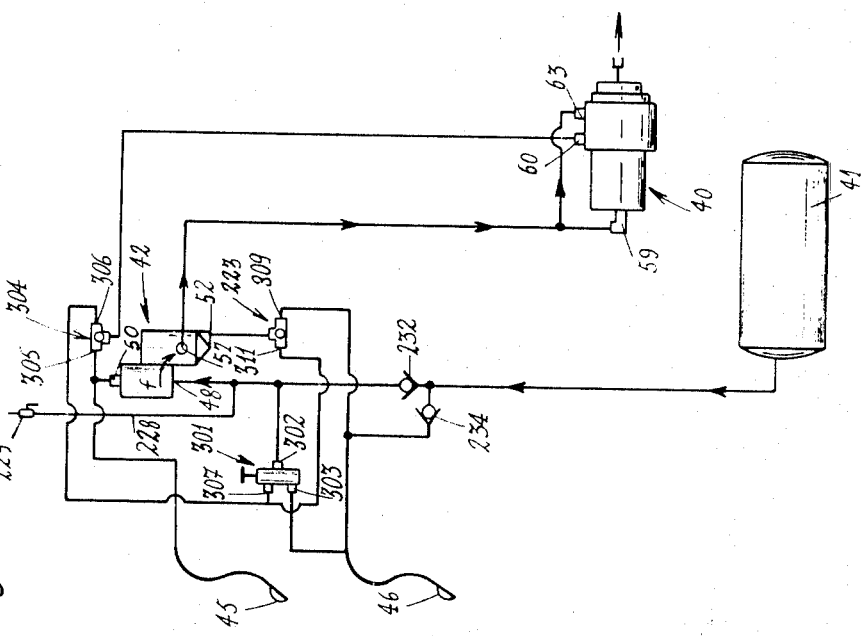

INVENTORS
JEAN GACHOT
FERNAND PERALES
By Young & Thompson
ATTYS.

Patented Sept. 12, 1972

INVENTORS
JEAN GACHOT
FERNAND PERALES
BY Young & Thompson
ATTYS.

Patented Sept. 12, 1972

INVENTORS
JEAN GACHOT
FERNAND PERALES
By Young + Thompson
ATTYS

COMPRESSED-AIR BRAKING AND LOCKING SYSTEM FOR TRAILERS OR SEMITRAILERS

This invention relates to a compressed-air braking and locking system for trailers or semitrailers.

Braking and locking systems of known types for trailers or semitrailers comprise at least one brake cylinder, pneumatic actuating devices for locking the brakes, an emergency relay valve and a compressed-air reservoir.

These known systems further comprise a first and a second coupling element which are intended to be connected respectively to the direct-control fluid circuit and to the automatic-control fluid circuit of a tractor vehicle. Said vehicle is provided with means for continuously applying an air pressure to the automatic control circuit when the trailer is coupled to the tractor, means for applying an air pressure to the direct control circuit when it is desired to apply the trailer brakes from the tractor and means for connecting the automatic control circuit to atmospheric pressure when it is desired to lock the trailer brakes from the tractor.

The term "emergency relay valve" is commonly used to designate a device which is intended to initiate application of the trailer brakes when the direct control circuit of the tractor is put under pressure and to produce automatic application and locking of the brakes in the event of either intentional disconnection or accidental failure of the couplings between the trailer and tractor.

With this objective, the emergency relay valve has a feed inlet which is connected to the compressed-air reservoir, an outlet which is connected to the braking and locking control inlets, a first control inlet and a second control inlet. The valve is so arranged that the feed inlet is put into communication with the valve outlet when an air pressure is applied to its first control inlet or when the second control inlet of the valve is connected to atmospheric pressure.

In systems for locking brake cylinders which are also known, the mechanical locking devices are actuated by locking control elements and unlocking control elements which are in turn actuated by delivery of compressed air in order to initiate both locking and unlocking.

In the known systems, the two control inlets of the emergency relay valve are connected respectively to each of the two couplings which are intended to be connected to the control circuits of the tractor. It is thus possible to apply and lock the trailer brakes from the tractor. Moreover, said brakes are automatically applied and locked when a failure occurs in the trailer coupling.

However, it is not possible under these conditions to release the trailer brakes, then to apply and lock the brakes again when the trailer is separated from the tractor. This is highly inconvenient when it is desired, for example, to move a parked trailer to a different position.

The primary aim of this invention is to overcome the disadvantage which has just been mentioned.

In accordance with this invention, the compressed-air braking and locking system for trailers or semitrailers which comprises at least one brake cylinder, air-actuated elements for locking the brakes comprising a locking control inlet and an unlocking control inlet, an emergency relay valve having an outlet connected to the brake cylinder and to the locking elements, a feed inlet connected to a compressed-air reservoir and a first and a second control inlet, said relay valve being adapted to put its feed inlet into communication with its outlet when an air pressure is applied to its first control inlet or when its second control inlet is connected to atmospheric pressure, the system being further provided with a first and a second coupling adapted to be connected respectively to a direct-control fluid circuit and to an automatic-control fluid circuit of a tractor vehicle, essentially comprises a hand-operated valve having at least two positions and at least one two-way valve which are so arranged that in a first position the first and second control inlets of the emergency relay valve are put into communication respectively with the first and the second couplings and that the communication between the reservoir and said first and second control inlets is cut off and that in a second position the reservoir is put into communication with the unlocking control inlet, the first and second couplings being at atmospheric pressure.

In the first position of the valve, the trailer brakes and locking of these latter can be controlled from the tractor vehicle. When the trailer is uncoupled, the trailer brakes can be unlocked and released by bringing the valve to its second position, whereupon the brakes can again be applied and locked by restoring the valve to the first position.

In an advantageous arrangement of the invention, the valve has a third position in which the reservoir is connected through said valve to the second control inlet of the emergency relay valve in order to exhaust the compressed air from the brake cylinder and from the locking elements while maintaining application and locking of the brakes.

Further properties and advantages of the invention will become apparent from the detailed description which follows below.

A number of embodiments of the invention are illustrated in the accompanying drawings which are given by way of example and not in any limiting sense, and in which:

FIG. 2 is a diagram which is similar to FIG. 1, the tractor vehicle being equipped for the purpose of coupling to a trailer;

FIGS. 9 to 12 are diagrams of a second embodiment of the trailer-brake application and locking system in accordance with the invention, the system being shown in four different positions;

FIG. 13 is a sectional view taken along line XIII—XIII of FIG. 14 and showing a valve employed in the system of FIGS. 9 to 12, said valve being shown in its first position;

FIG. 14 is a sectional view taken along line XIV—XIV of FIG. 13;

FIGS. 15 and 16 are partial views which are similar to FIG. 13, the valve being shown in its third and second position respectively;

FIG. 17 is a part-sectional view taken along line XVII—XVII of FIG. 13;

FIGS. 18 and 19 are sectional views of a retarding valve employed in the system of FIGS. 9 to 12;

FIGS. 20 and 21 are diagrams of a third embodiment of the trailer-brake application and locking system in accordance with the invention, the system being shown in two different positions;

Figure 1:
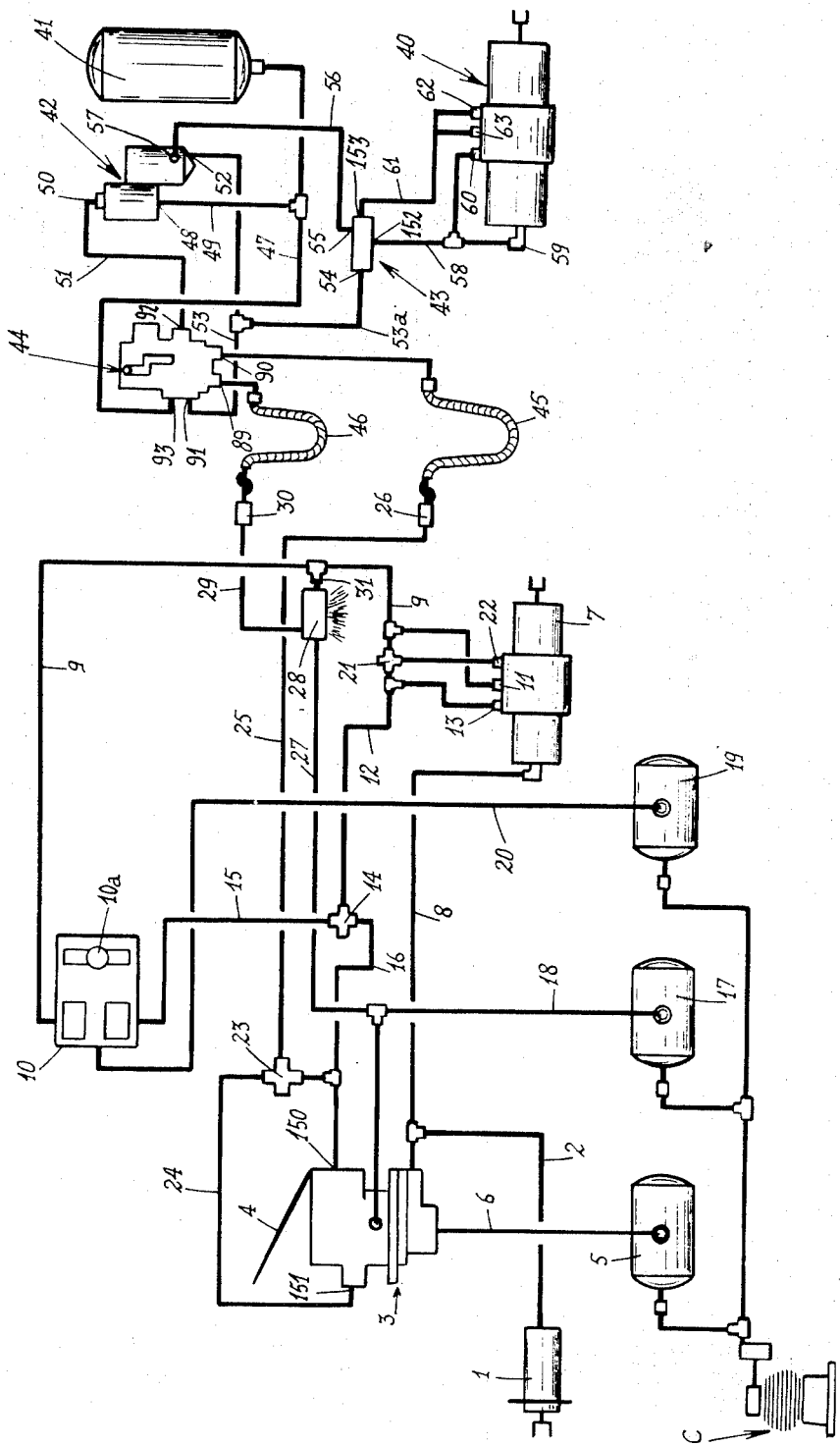
FIG. 1 is a general diagram of the braking system of a tractor vehicle and of the trailer-brake application and locking system in accordance with the invention, the tractor vehicle being equipped for the purpose of coupling to a semitrailer.
Figure 4:
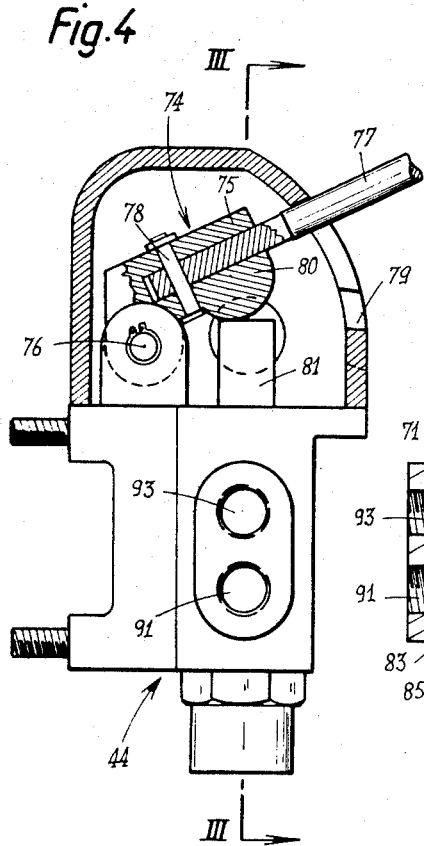
FIG. 4 is a part-sectional side view of the valve of FIG. 3.
Figure 3:
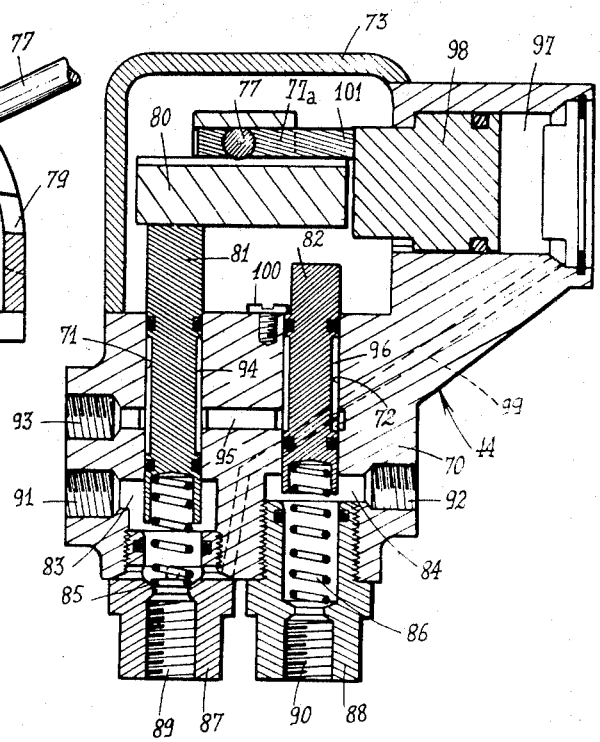
FIG. 3 is a sectional view taken along line III—III of FIG. 4 and showing a valve which is employed in the system of FIGS. 1 and 2, said valve being shown in its first position.
Figure 5:
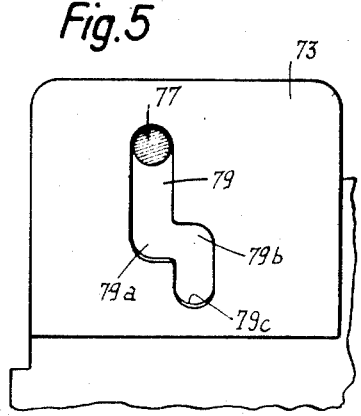
FIG. 5 is a partial side view of the same valve.
Figure 6:
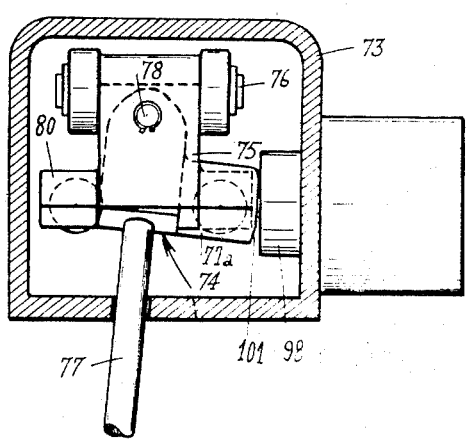
FIG. 6 is a part-sectional plan view of the same valve.

The general diagrams of the braking system of a tractor vehicle and of the braking and locking system of a trailer in the case of a semitrailer and a trailer respectively are shown in FIGS. 1 and 2. Only the braking devices of the tractor are different whereas the braking and locking systems of the trailer are identical.

In the case of a semitrailer which is illustrated in FIG. 1, provision is made for a common system or so-called braking circuit for both the front and rear brake cylinders of the tractor vehicle whereas, in the case of the trailer which is illustrated in FIG. 2, said cylinders are provided with independent braking circuits.

In the case of the semitrailer, the front brake cylinder 1 of the tractor is supplied through a pipe 2 which is connected to a conventional brake valve 3, said valve being actuated by the brake pedal 4 and supplied with compressed air from a reservoir 5 via a pipe 6. Said reservoir 5 is in turn supplied from an air compressor C. The brake cylinder 7 which controls the rear-wheel brakes of the tractor is supplied for service brake-application through a pipe 8 and this latter is connected to the pipe 2 which supplies the front-wheel cylinder 1. The cylinder 7 is equipped with air-operated locking elements and provision is made for two compressed-air distribution circuits which serve to control said locking elements. The first distribution circuit which is employed for locking control comprises a pipe 9 connected to the outlet of a manual control box 10 and to an inlet 11 for controlling the locking elements of the cylinder 7. The second distribution circuit which has the intended function of unlocking control comprises a pipe 12 for connecting an unlocking-control inlet 13 to a two-way valve 14. Said valve is connected by means of a pipe 15 to the other outlet of the manual control box 10 and by means of a pipe 16 to a discharge port 150 of the valve 3. By means of the valve 3, said discharge port 150 can be put into communication with the compressed-air reservoir 5 via the pipe 6. The manual control box 10 of conventional type is fed with compressed air which is supplied from an emergency reservoir 19 via a pipe 20; the design function and operation of the control box will be explained hereinafter. In addition, the pipes 9 and 12 are connected respectively to the inlets of a two-way valve 21, the outlet of which is connected to an emergency-application control inlet 22.

Another discharge port 151 of the valve 3 which can be put into communication with a compressed-air reservoir 17 by means of said valve and via a pipe 18 is connected to a two-way valve 23 by means of a pipe 24. Said valve 23 is also connected to the pipe 16 and the valve outlet is connected through a pipe 25 to a union 26 which is intended to be connected through a first coupling 45 to the braking and locking system of the trailer. The circulation system which is thus formed is usually referred-to as the "direct-control circuit" or more simply as the "direct circuit."

There is connected to the pipe 18 which extends from the reservoir 17 an exhaust valve 28, the outlet of which is connected through a pipe 29 to a union 30. The exhaust valve 28 is provided with a control inlet 31 which is connected to the pipe 9. The valve 28 is designed in a manner which is known per se so that, when an air pressure is applied to said control inlet 31, the pipe 27 is shut off and the pipe 29 is vented to the atmosphere. On the contrary, when there is zero pressure at the control inlet 31, the valve 28 puts the pipes 27 and 29 into communication with each other after having cut-off the exhaust to the atmosphere.

The union 30 is intended to be connected to the braking and locking system of the semitrailer by means of a second coupling 46. The circulation system which has just been described is usually referred-to as the "automatic control circuit" or simply as the "automatic circuit."

The braking system for a vehicle which draws a trailer as shown in FIG. 2 differs from the previous system in that the front-wheel brake cylinders 1 and rear-wheel cylinders 7 of the vehicle are supplied through separate circuits. The same references are employed in the drawings in order to designate similar elements.

The pipe 24 supplies the rear-wheel cylinder 7 with compressed air for service brake-application from the discharge port 151 of the valve 3 which can be put into communication with the reservoir 17 via the pipe 18. In addition, the pipe 12 which is intended for emergency brake-application is directly connected to the discharge port 150 of the valve 3 which can be put into communication with the reservoir 5 via the pipe 6. In his case, the valves 14 and 23 of FIG. 1 are combined in a single valve 14 at which the pipes 8 and 15 terminate and from which extends the direct-control pipe 25. The other circuits remain unchanged.

The braking and locking system for trailers or semitrailers as illustrated in FIGS. 1 and 2 will now be described.

Said system comprises a brake cylinder 40 which is similar to the brake cylinder 7 of the tractor vehicle, a compressed-air reservoir 41, an emergency relay valve 42, a reversing valve 43 which is placed between the emergency relay valve and the brake cylinder and a multi-ported manual control valve 44 having two inlets 89 and 90 which are connected to the direct and automatic circuits of the tractor vehicle by means of the couplings 45, 46 respectively.

The multi-ported valve 44 also has a third inlet 93 which is connected to the reservoir 41 through a pipe 47, said reservoir being also connected to the feed inlet 48 of the emergency relay valve 42 by means of a pipe 49 connected to the pipe 47. The multi-ported valve 44 has two outlets, one outlet 92 being connected to the first control inlet 50 of the emergency relay valve by means of a pipe 51 while the other outlet 91 is connected by means of a pipe 53 to the second control inlet 52 of the emergency relay valve 42 ; a pipe 53a is connected to the pipe 53 and to the control inlet 54 of the reversing valve 43.

The reversing valve 43 is provided with an inlet 55 which is connected through a pipe 56 to the outlet 57 of the emergency relay valve and with two outlets. A first outlet 152 is connected through a pipe 58 to the service-application control inlet 59 and to the unlocking-control inlet 60. A second outlet 153 is connected by means of a pipe 61 to the emergency-application control inlet 62 and to the locking-control inlet 63.

It is recalled that, when a pressure is applied to the first and to the second control inlets 50 and 52 of the emergency relay valve 42, said valve establishes a communication between its feed inlet 48 and its outlet 57. If the first control inlet 50 is at atmospheric pressure and the second control inlet 52 is under pressure, the outlet 57 is opened to the atmosphere and the second control inlet 52 is connected to the feed inlet 48. Finally, if the second control inlet 52 is at atmospheric pressure, the feed inlet 48 is put into communication with the outlet 57.

Furthermore, the reversing valve 43 puts its inlet 55 into communication with the pipe 58 for service brake-application and unlocking when its control inlet 54 is under pressure and with the pipe 61 for emergency application and locking when the control inlet 54 is at atmospheric pressure.

The manual control-valve unit 44 will now be described in detail with reference to FIGS. 3 to 8.

The valve unit 44 comprises a body 70 in which are mounted two valves. There is fixed on the body 70 a cover 73 which contains a manual control mechanism as generally designated by the reference numeral 74. This mechanism consists of a block 75 which is pivoted about a pin 76 on the valve body 70 and of an actuating lever 77, one extremity of which is rigidly fixed to an elbowed member 77a, said member being engaged in a recess of the block 75 in which the lever is rotatably mounted on a pin 78 located at right angles to the pivot-pin 76. The lever 77 passes out of the cover 73 through an opening 79 in the form of two parallel elongated slots which are joined together at one end, the junction zone being intended to permit of limited angular displacement of the lever 77 about its pivot-pin 78 between the end portions 79a and 79b of said junction zone which define intermediate positions of said lever.

The articulated block 75 is provided with a boss 80 which is adapted to come into contact with closure members which are intended to shut-off the two valves and consist of two plungers 81, 82 housed within bores 71 and 72 respectively of the body 70. The plungers 81 and 82 have different lengths so that only the plunger 81 is in contact with the boss 80 of the block 75 when the lever 77 is located in the top or service position shown in FIGS. 3 to 6. The lower ends of the plungers are adapted to penetrate respectively in the chambers 83, 84 and are fitted respectively with a spring 85, 86 which urges each plunger to the top or service position. The chambers 83 and 84 are coaxial with the bores 71 and 72 and located in the line of extension of these latter.

The travel of the plunger 82 is limited at the top by a screw 100 which is fixed on the valve body. Each spring is applied against the bottom of a bore formed in an end-piece 87 or 88 which is attached to the valve body 70. The ports 89 and 90 of said end-pieces open axially into corresponding chambers 83 and 84 and constitute the first inlets of the two valves. Two further ports 91, 92 formed in the valve body 70 open laterally in the first case into the chamber 83 and in the second case into the chamber 84 ; said ports communicate with the inlets 89, 90 respectively when the valves are in the position shown in FIGS. 3 to 6 ; said ports 91, 92 constitute the outlets of the two valves.

Another port 93 which is formed in the valve body 70 opens laterally into an annular chamber 94 which is formed between a portion of reduced cross-sectional area of the plunger 81 and the bore 71. A duct 95 also provides a connection between said annular chamber 94 and a similar chamber 96 which is formed between a portion of reduced cross-sectional area of the plunger 82 and the bore 72.

In addition, a bore 97 in which is mounted a piston 98 is formed in a part of the valve body 70 which is located at the level of the actuating mechanism 74. The bore 97 communicates with the port 89 through a duct 99 which is formed in the valve body. The piston 98 is adapted to come into contact with a portion 101 of the elbowed member 77a when compressed air is admitted into the bore 97 ; in consequence, when the lever 77 is located in the second intermediate position 79b, said lever can be returned automatically to its first intermediate position 79a, in which case the springs 85, 86 thrust back the plungers and therefore the lever to the top position.

Packing-rings are fitted on the plungers 81, 82 in order to isolate the annular chambers 94 and 96. Provision is also made for packing-rings within the end-pieces 87 and 88 into which the lower ends of the plungers 81 and 82 can therefore penetrate in leak-tight manner.

Figure 7:
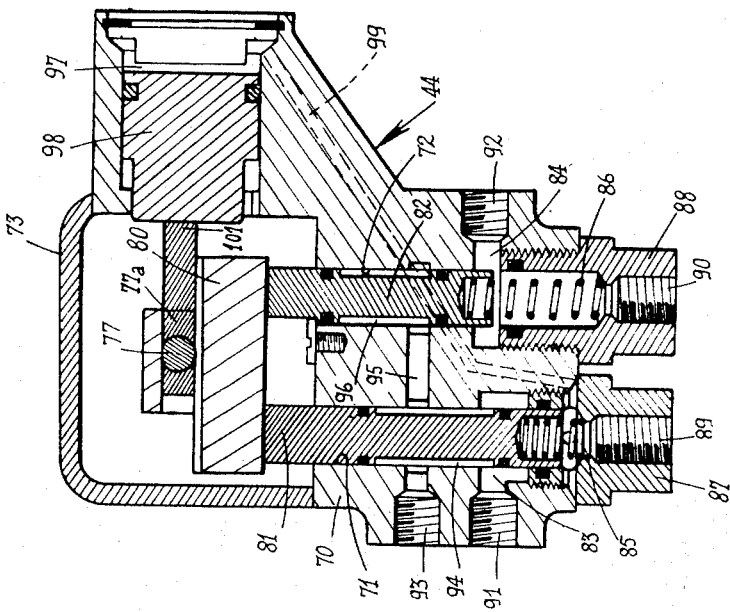

The arrangement is such that when the lever 77 is actuated so as to move from the top position shown in FIGS. 3 to 6 to the intermediate position 79a and then 79b, only the plunger 81 is displaced by the boss 80 of the articulated block 75 so that the lower end of said plunger penetrates into the end-piece 87 and comes into leak-tight contact with this latter ; the annular chamber 94 which is formed around the plunger 81 then establishes a communication between the ports 91 and 93 while the admission port 89 is isolated (as shown in FIG. 7).

Figure 8:
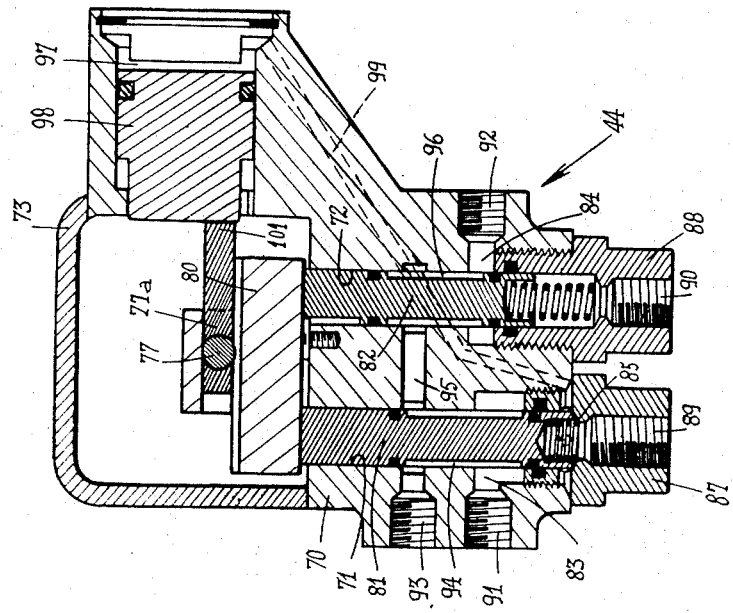
FIGS. 7 and 8 are views which are similar to FIG. 3, the valve being shown in its third and second position respectively.

When the operating lever is moved from the intermediate position 79b towards the lower end 79c of the opening 79, the two plungers 81 and 82 are displaced so that the plunger 81 still establishes a communication through the annular chamber 94 between the ports 91 and 93 and so that, in addition, the annular chamber 96 which is formed around the plunger 82 establishes a communication between the duct 95 and consequently between the port 93 and the port 92 while the lower end of said plunger 82 penetrates into the end-piece 88 in order to ensure leak-tight contact within this latter and also in order to isolate the admission port 90 (as shown in FIG. 8).

Referring again to FIGS. 1 and 2, consideration will now be given to the operation of the braking and locking system which is designed for trailers or semitrailers and comprises the manual control valve unit 44.

During normal operation and when the trailer or semitrailer is coupled, the admission port 89 of the valve unit 44 is connected by means of the second coupling 46 to the automatic circuit of the tractor vehicle, that is to say to the air reservoir 17. The admission port 90 is connected by means of the first coupling 45 to the direct control circuit of the tractor vehicle, that is to say to the brake valve 3. The actuating lever of the valve unit 44 is in its first position (top position) so that the plungers 81 and 82 permit communication on the one hand between the ports 89, 91 and on the other hand between the ports 90, 92. The port 93 which is connected to the reservoir 41 of the trailer or semitrailer is isolated from the automatic circuit. Under these conditions, the pipe 53 delivers compressed air to the second control inlet 52 of the emergency relay valve 42 and the pipe 53a delivers a compressed-air pressure to the control inlet 54 of the reversing valve 43. Furthermore, the pipe 51 transmits the pressure of the tractor-vehicle braking system to the first control inlet 50 of the emergency relay valve 42. The result thereby achieved is that, under normal operating conditions and without brake application, the first control inlet 50 of the emergency relay valve is at atmospheric pressure and that the feed inlet 48 of said valve is then put into communication with the second control inlet 52, thereby maintaining the pressure within the reservoir 41. For normal or service brake-application, the pedal 4 is depressed and the first control inlet 50 is put under pressure so that the feed inlet 48 of the emergency relay valve is put into communication with the outlet 57, thereby initiating application of the trailer brakes ; in fact, the reversing valve 43, the control inlet 54 of which is under pressure, operates in such a manner as to direct the compressed air derived from the pie 56 towards the pipe 58 and consequently towards the control inlet 59 for service application and towards the control inlet 60 for unlocking the brake cylinder 40.

In the event of failure of the trailer coupling, the two control inlets 52 and 50 of the emergency relay valve 42 are at atmospheric pressure since the compressed air is no longer supplied from the control circuits of the tractor vehicle. The feed inlet 48 is then put into communication with the outlet 57 of the emergency relay valve and the reversing valve 43, the control inlet 54 of which is now at atmospheric pressure, operates so as to deliver compressed air from the pipe 56 into the pipe 61 and consequently to the control inlet 62 for emergency application and to the control inlet 63 for locking the brake cylinder 40.

The manual control box 10 which is provided in the braking system of the tractor vehicle assumes a neutral position during normal operation so that the pressure at the control inlet 31 of the exhaust valve 28 is atmospheric pressure. The pipes 27 and 29 are accordingly connected to each other and the pressure of the reservoir 17 is transmitted to the pipe 29 and consequently to the admission port 89 of the valve unit 44 as has been explained earlier.

Should it be found desirable to lock the brakes for the purpose of parking the trailer or semitrailer, the lever 10a of the control box 10 is displaced to the locking position in which the pipe 9 is put into communication with the pipe 20 which is connected to the reservoir 19. The control inlet 31 of the exhaust valve 28 is then under pressure and communication between the pipes 27 and 29 is cut off. The automatic control circuit is then at atmospheric pressure. The operation is identical with that which is observed in the case of trailer-coupling failure and similarly results in application and locking of the trailer brakes by means of the cylinder 40. The brakes of the tractor vehicle are also locked ; the pipe 9 delivers compressed air to the control port 11 for brake-locking and to the control port 22 for emergency brake-application.

When the trailer is unhitched, the couplings 45 and 46 are brought to atmospheric pressure and the trailer brakes are automatically applied and locked as has been explained earlier in connection with accidental trailer-coupling failure. The trailer can therefore be parked under the best conditions of safety.

Should it be desired do change the position of the trailer without making use of a tractor while said trailer is parked, the lever 77 is actuated so as to be brought into its second position (bottom position 79c in the lower portion of the opening 79). The plungers 81 an 82 (shown in FIG. 8) are displaced downwards. The ports 91 and 93 again communicate with each other through the annular chamber 94 and the discharge port 92 is also put into communication with the admission port 93 by means of the annular chamber 96 and the pipe 95. Since the compressed-air pressure of the reservoir 41 is then transmitted to the two control inlets 50 and 52 of the emergency relay valve 42 and to the control inlet 54 of the reversing valve 43, compressed air is delivered through the pipe 58, thereby initiating service application and unlocking within the cylinder 40.

By returning the lever 77 to its third position (intermediate position 79b), the plunger 81 (FIG. 7) maintains a communication between the ports 91 and 93 while the plunger 82 puts the outlet 92 into communication with the inlet 90 which is open to the atmosphere. The first control inlet 50 of the emergency relay valve is therefore at atmospheric pressure whilst the second control inlet 52 of said valve is at the pressure of the reservoir 41. Under these conditions, the emergency relay valve 42 connects it outlet 57 to the atmosphere.

In addition, the control inlet 54 of the reversing valve is at the pressure of the reservoir 41 and the pipe 58 is put into communication with the pipe 56. The service-application control inlet 59 and unlocking-control inlet 60 are therefore connected to atmospheric pressure and the trailer brakes which had previously been unlocked are released and the trailer can thus be displaced.

In order to re-apply and re-lock the brakes of the trailer or semitrailer after having displaced this latter, the actuating lever 77 must accordingly be returned to its first position (top position) in which the cylinder 40 is supplied with compressed air for auxiliary brake-application and locking as has been explained earlier.

Finally, if the actuating lever 77 is in its third position (intermediate position 79b as shown in FIG. 7) and if the trailer is re-coupled, the pressure of the automatic control circuit of the tractor vehicle is transmitted through the duct 99 to the bore 97. Consequently, the piston 98 is displaced towards the portion 101 of the member 77a which is rigidly fixed to the actuating lever 77, said lever being thrust back to the intermediate position 79a. The lever is then brought back automatically to the top normal-service position under the action of the springs 85, 86 which urge the plungers 81, 82 and therefore the articulated block 75 in the upward direction.

A second embodiment of the braking and locking system for trailers or semitrailers will now be described with reference to FIGS. 9 to 12.

In this embodiment, the brake cylinder 40 is of the single-piston type and has only one control inlet 59 for service brake-application. Moreover, the dimensions of the locking and unlocking control elements are such that the action of the unlocking control elements is preponderant over the action of the locking control elements when the same air pressure is applied simultaneously to the locking control inlet 63 and unlocking control inlet 60.

The outlet 57 of the emergency relay valve 42 is connected to the braking control inlet 59 and locking control inlet 63 and the feed inlet 48 of said valve is connected through a line 208 to the compressed-air reservoir 41. The first and second control inlet 50 and 52 are connected respectively to the outlet of two double stop valves 222 and 223.

The couplings 45 and 46 which are intended to be connected respectively to the direct control and automatic control circuits of a tractor vehicle (not shown) are joined by means of permanent connections 215 and 216 to a first inlet of the double valves 222 and 223 respectively.

A manual control valve 217 which will be described hereinafter has two inlets 218 which are both connected to the feed inlet 48 of the emergency relay valve. The valve 217 has two outlets 220 and 221 which are connected respectively to the second inlet of the double stop valve 222 and 223.

The unlocking control inlet 60 of the cylinder 40 is connected to the first control inlet 50 of the emergency relay valve by means of a pipe 226 with interposition of a retarding valve 227 which will be described hereinafter and is intended to retard the air flow only in one direction, namely from the control inlet 60 to the double stop valve 222.

A line 228 which is fitted with a stop valve 229 is connected at one end to the feed inlet 48 of the emergency relay valve and at the other end to a flexible coupling or hose 231 which is intended to be connected to an auxiliary compressed-air reservoir (not shown). A check valve 232 which prevents the flow of air towards the compressed-air reservoir 41 is mounted in the line 208 directly at the outlet of the reservoir.

The permanent connection 216 is connected to the outlet of the reservoir 41 through a pipe 233 and a check valve 234 which prevents the flow of air from the reservoir 41 to the connection 216.

The valve unit 217 which is illustrated in FIGS. 13 to 17 consists of a body 241 which encloses two similar valves 242 and 243. Each valve has two chambers which are connected to each other through an opening 244 which can be closed by a movable shutter 246 fitted with a restoring spring 248. The first two chambers of said valves are connected to each other by means of a passageway 219 and the common admission port 218 opens into one of said chambers. The valve discharge ports 220 and 221 open respectively into the second chambers. The shutters 246 are actuated by pushers 251 which are fitted with restoring springs 252 and pierced by an axial duct 253.

The valve unit 217 has a single mechanism 254 for operating the two shutters 246 by means of the pushers 251. Said mechanism which is protected by a casing 255 comprises two side-plates 258 which are rigidly fixed to a sleeve 256, said sleeve being keyed on a shaft 257 which is carried by the casing 255. An operating lever 225 which is placed outside the casing serves to drive the shaft 257 in rotation. The side-plates 258 are adapted to carry two shafts 259 on which are mounted two rollers 260, 261 and these latter are so arranged as to bear respectively on the pushers 251 of each valve 242, 243 when the shaft 257 is driven in rotation.

The control lever 225 can assume three different positions A, B, C corresponding respectively to the closure of the two shutters 246 (FIGS. 9, 10, 13), to the opening of the shutter of the valve 242 (FIGS. 11, 15) and to the opening of the two shutters 246 (FIGS. 12, 16). The mechanism maintains the lever 225 in position when it has been brought into the positions A and B and returns the lever to position B when this latter is released after having been brought to position C.

The valve unit 217 further comprises a cylinder 262 (as shown in FIG. 13) which is secured to the casing 255 and into which opens an admission port 224 which is connected through the coupling 46 to the automatic control circuit of the tractor vehicle. A piston 263 is slidably mounted in the cylinder 262 and the piston rod 264 penetrates into the interior of the casing 255 and is applied against the roller 260. The bottom portion of the cylinder 262 is connected to the atmosphere through an aperture 266.

The retarding valve 227 (shown in FIGS. 18, 19) comprises a body 270 and a port 271 which body through a valve seat 273 and is connected to the first control inlet 50 of the emergency relay valve (FIG. 9). The valve body 270 is closed by a threaded plug 272 through which is formed a port 274 and this latter is connected to the unlocking control inlet 60. The port 274 opens into the valve body 270 via a tube which is pierced by two radial ducts 275 and the extremity of which constitutes a second valve seat 276 placed opposite to the first seat 273. A closure member 277 which is mounted between the valve seats 273 and 276 is pierced by a central passageway 278 and provided on that face which is directed towards the seat 276 with a disc 279 having a central aperture 281, the diameter of which is substantially smaller than that of the passageway 278. A spring 282 tends to apply the closure member 277 against the valve seat 273.

The braking and locking system which has just been described operates as follows.

When the trailer is coupled to a tractor vehicle, the lever 225 of the valve 217 is in position A (as shown in FIG. 13). The roller 260 is level with the pusher 251 of the valve 242 without depressing this latter and the two valves 242 and 243 are closed. The two discharge ports 220 and 221 of the valve are connected to the atmosphere through the ducts 253 of the pushers. The valve 229 is closed. The automatic control circuit is maintained under pressure by the tractor vehicle so that the piston 263 accordingly maintains the valve unit 217 in said position A. In normal service, the direct control circuit of the tractor is at atmospheric pressure. Under these conditions, the emergency relay valve 42 puts the valve outlet 57 into communication with the atmosphere and neither brake application nor locking takes place since all the braking, locking and unlocking control elements are at atmospheric pressure.

In order to apply the brakes during motion of the vehicle while the trailer is still coupled and the lever 225 is in position A, the driver of the tractor puts the direct control circuit under pressure and the automatic circuit remains under pressure. Under these conditions (as shown in FIG. 9), the two control inlets 50 and 52 of the emergency relay valve 42 are both under pressure. The air of the reservoir 41 is admitted to the braking control inlet 59 and locking control inlet 63 whilst the air delivered by the direct circuit of the tractor is admitted to the unlocking control inlet 60.

Since the action of the unlocking control elements is preponderant, the brakes are applied but not locked. Moreover, when the driver no longer exerts braking action, the retarding valve 227 slows-down the air flow which is exhausted through the inlet 60. Thus, the action of the unlocking elements is not only preponderant but is also maintained over a longer period of time so that any danger of locking of the brakes while in motion is removed.

It is apparent from FIGS. 18 and 19 that, when air is caused to flow towards the unlocking control inlet (as shown in FIG. 18), the closure member 277 is applied against the valve seat 276 and the air flows freely through the retarding valve 227 by passing through the radial ducts 275. On the contrary, when the air passes out through the unlocking elements (FIG. 19), the closure member 277 is applied against the valve seat 273 and the air is caused to flow through the small aperture 281 of the disc 279, thereby reducing its flow velocity.

FIG. 10 shows the operation of the system in the case of brake application and locking, the lever 225 of the valve unit 217 being again in position A. This operation can be carried out either manually by the driver of the tractor when the trailer is hitched or automatically when the trailer is unhitched or when there is an accidental failure of the coupling. In all cases, the automatic circuit of the tractor is connected to atmospheric pressure either intentionally or otherwise and the direct circuit also remains at said atmospheric pressure.

It has been noted that, under these conditions, the emergency relay valve puts its valve outlet 57 into communication with its feed inlet 48. Since the unlocking elements are not actuated, the brakes are applied and locked.

When the trailer is uncoupled, the lever 225 of the valve unit 217 is moved to position B (as shown in FIG. 15). The roller 260 depresses the pusher 251 of the valve 242 while the roller 261 comes level with the pusher of the valve 243 but does not depress said pusher. Thus (as shown in FIG. 11), the air of the reservoir 41 is admitted through the outlet 221 of the valve 217 to the double stop valve 223 and from this latter to the second control inlet 52 of the emergency relay valve. As has been stated in the foregoing, said relay valve connects its outlet 57 to the atmosphere ; this makes it possible to discharge the air which had been delivered automatically to the brake cylinder and to the locking elements at the moment of uncoupling. The brakes remain applied and locked as a result of mechanical action.

If it is desired to unlock and release the brakes after uncoupling the trailer in order to change the position of this latter, for example, the lever is displaced to position C (as shown in FIG. 16). The two rollers 260 and 261 depress the pushers 251 of the two valves 242 and 243 so that the air of the reservoir 41 is admitted via the two outlets 220 and 221 of the valve unit 217 (as shown in FIG. 12) and through the double stop valves 222 and 223 to the two control inlets 50 and 52 of the emergency relay valve. The conditions of FIG. 9 are thus restored and the brakes are unlocked.

When the lever 225 is released, said lever is brought automatically to position B. The air of the brake cylinder and of the locking elements is discharged through the emergency relay valve and the air of the unlocking elements is discharged through the outlet 220 of the valve unit 217 which is put into communication with the atmosphere and through the coupling 45. The retarding valve 227 comes into operation in order to ensure that the action produced on the unlocking elements is maintained for a longer period of time than the action produced on the braking and locking elements and that the brakes are consequently unlocked and released.

After changing the position of the trailer, the brakes can again be applied and locked by returning the lever 225 to position A as explained earlier with reference to FIG. 10.

When the trailer is again coupled to a tractor vehicle, the automatic control circuit of which is under pressure, the piston 263 (shown in FIG. 13) returns the lever 225 automatically to the "running" position A if said lever was not already in this position.

If the trailer remains parked over a long period of time, the reservoir 41 may be emptied as a result of faulty leak-tightness. Even in this case, in order to permit displacement of the trailer without entailing the use of a tractor vehicle, the invention makes it possible to supply the braking and locking system temporarily through an auxiliary compressed-air reservoir to which the flexible hose 231 is connected. By way of example, said auxiliary reservoir can be constituted by one of the trailer tires.

When the valve 229 is opened, the air of the auxiliary reservoir aforesaid reaches the inlets 218 of the valve unit 217 and the feed inlet 48 of the emergency relay valve. All the operations shown in FIGS. 10 and 12 can therefore be carried out. The check valve 232 prevents the flow of air towards the trailer reservoir 41, thereby preventing any substantial pressure drop in the auxiliary reservoir which is employed.

When the trailer is again coupled to a tractor, the lever 225 is returned automatically to position A as has been stated in the foregoing and the reservoir 41 is accordingly filled with the air which flows from the automatic circuit of the tractor via the lines 216 and 233 and the check valve 234.

The third embodiment of the braking system for trailers or semitrailers as illustrated in FIGS. 20 and 21 differs from the second embodiment as hereinabove described in that it comprises a valve 301 which has only two positions and which will be described in detail hereinafter.

The valve 301 has a main inlet 302 which is connected to the feed inlet 48 of the emergency relay valve 42 and an auxiliary inlet 303 which is connected to the second coupling 46, said coupling being connected to the automatic control circuit of the tractor when the trailer is hitched.

The outlet 307 of the valve 301 is connected to an inlet 306 of a first double stop valve 304 and to an inlet 311 of a second double stop valve 223. Said stop valve 223 is otherwise connected as in the second embodiment described above.

The outlet of the first double stop valve 304 is connected to the unlocking control inlet 60 and its other inlet 305 is connected to the first control inlet 50 of the emergency relay valve and also to the first coupling 45 which is connected to the direct control circuit of the tractor when the trailer is hitched.

The remainder of the circuit is similar to the circuit shown in FIGS. 9 to 12.

The inlet 311 of the second stop valve 223 which is connected to the outlet of the valve 301 has a distinctly smaller flow cross-section than either the other inlet 309 of said stop valve or the inlets of the first double stop valve 304.

Figure 23:
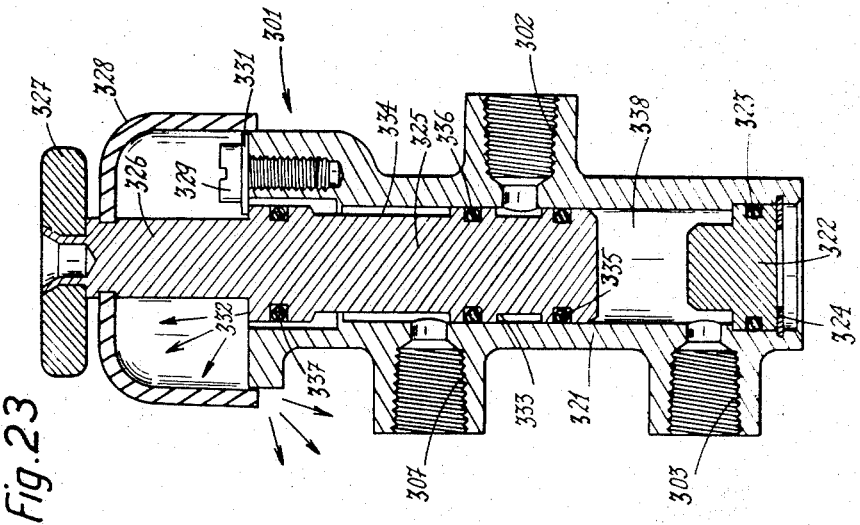
FIGS. 22 and 23 are axial sectional views of a valve which is employed in the system of FIGS. 20 and 21, said valve being shown in two different positions.
Figure 22:
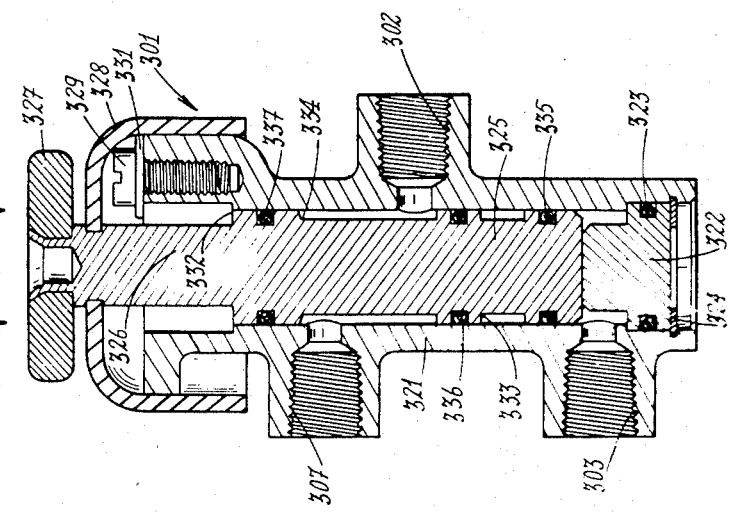

The valve 301 (as shown in FIGS. 22 and 23) has a cylindrical tubular body 321 provided with a main admission port 302, an auxiliary admission port 303 and the discharge port 307. One end of the body 321 is closed by a plug 322 which is fitted with a seal 323 and held in position by means of a resilient split-ring 324.

A two-position movable obturator 325 is slidably mounted within the internal bore of the body 321. Said obturator 325 has an extension in the form of a stem 326 which supports an operating knob 327 and a cap 328 of flexible and deformable material which is intended to cover the open end of the body 321. A screw 329 which is fixed in the wall of the body 321 maintains a washer 331 which projects within the interior of the body in order to limit the travel of the obturator 325 by being applied against an annular shoulder 332 of said obturator.

The obturator 325 has a first annular channel 333 and a second annular channel 334 which is of greater width than the first channel, annular sealing rings 335 to 337 being fitted on each side of said channels.

In the closed position (as shown in FIG. 23), the obturator 325 is abuttingly applied against the washer 331. The channel 333 is then located opposite to the main admission port 302 which is thus isolated. The channel 334 establishes a communication between the discharge port 307 and the open end of the body 321. Since the cap 238 is then applied against the valve body 321 only by means of its end portion and is made of deformable material, the discharge port 307 cannot be at a pressure which is higher than atmospheric pressure.

In the open position (as shown in FIG. 22), the shutter is downwardly displaced within the body 321 until it is brought to bear on the plug 322. The channel 334 then connects the main admission port 302 to the discharge port 307.

The auxiliary admission port 303 opens into a chamber 338 (as shown in FIG. 23) which is formed between the plug 322 and the extremity of the obturator. When said admission port 303 is connected to the automatic control circuit of the tractor vehicle, the pressure of said circuit returns the obturator 325 automatically to the closed position (as shown in FIGS. 20 and 23).

The system operates as follows:

Under normal running conditions when the trailer is coupled to the tractor vehicle, brake application is carried out as described in the foregoing by putting the direct control circuit under pressure. The valve 301 is then maintained in the closed position as a result of the pressure of the automatic control circuit.

When the trailer is uncoupled, the valve 301 being still in the closed position (as shown in FIGS. 20 and 23), the two couplings 45 and 46 are both restored to atmospheric pressure as well as the two control inlets 50 and 52 of the emergency relay valve. Under these conditions, it is known that said relay valve establishes a communication between its outlet 57 and its feed inlet 48 (as shown by the arrow $f$ in FIG. 20). The braking control inlet 59 and locking control inlet 63 are thus put under pressure whereas the unlocking control inlet 60 is maintained at atmospheric pressure, the two inlets 305 and 306 of the double stop valve 304 being in turn at atmospheric pressure. The trailer brakes are therefore applied and the locking elements are actuated.

If the trailer remains uncoupled and parked for an appreciable period of time, the air pressure within the brake cylinder and within the locking control elements decreases progressively. Under these conditions, the brake control stem is effectively locked mechanically as is well known to those versed in the art.

Said braking and locking of the trailer takes place also in the event of accidental failure of the coupling or at standstill in the event that the trailer is still coupled and that the automatic control circuit of the tractor vehicle is connected to atmospheric pressure by means of a locking valve.

When the trailer is uncoupled and it is desired to unlock and release the trailer brakes in order to move the trailer to a different position, for example, the valve 301 is brought to the open position (as shown in FIGS. 21 and 22). The discharge port 307 of the valve is then at the pressure of the reservoir and this pressure is transmitted through the double stop valve 304 to the unlocking control inlet 60. The second control inlet 52 of the emergency relay valve 42 is also put under pressure so that the outlet 57 is put into communication with the atmosphere.

However, by reason of the small flow cross-section of the admission port 311 of the double stop valve 223, said application of pressure to the second control inlet 52 takes place only after a certain time-lag with respect to the application of pressure to the unlocking control inlet 60.

Thus, when the valve 301 is brought to the open position (as shown in FIG. 21), there first takes place an initial stage during which the unlocking control elements are put under pressure whereas the braking and locking control elements are still under pressure themselves.

The action of the air pressure on the braking elements removes any danger of jamming or wedging of the locking elements on the brake control stem. Furthermore, as has been stated in the foregoing, the dimensions of the locking and unlocking elements are such that if the same pressure is applied simultaneously to the locking control inlet 63 and unlocking control inlet 60, the action of the unlocking control elements is preponderant. Under these conditions, the brakes are effectively unlocked.

After this initial stage, the pressure of the reservoir 41 is applied to the second control inlet 52 of the emergency relay valve 42. The braking control inlet 59 and locking control inlet 63 are then connected to the atmosphere through the emergency relay valve while the pressure remains applied to the unlocking control inlet 60. The trailer brakes are therefore released.

The trailer can accordingly be displaced and its brakes can then be applied and locked again by returning the valve 301 to the closed position (as shown in FIG. 20).

When the trailer is again coupled, the pressure of the automatic control circuit of the tractor vehicle as applied to the auxiliary admission port 303 of the valve automatically returns and maintains the movable obturator 325 in its closed position (as shown in FIGS. 20 and 23) which corresponds to the running position, the brake control being effected from the tractor vehicle.

The fourth embodiment which is shown in FIGS. 24 to 27 differs from the preceding only insofar as the admission port 305 of the first double stop valve 304 is not connected to the first control inlet of the emergency relay valve but is connected to the second coupling 46 and consequently the automatic control circuit of the tractor vehicle when the trailer is coupled.

The flow cross-sections of the admission ports of the second double stop valve 223 are distinctly smaller than those of the admission ports of the first double stop valve 304.

The remainder of the circuit is similar to the circuit shown in FIGS. 20 and 21. However, for the sake of enchanced clarity of the drawings, the emergency line 228 and the check valves 232 and 234 have not been shown in FIGS. 24 to 27. However, it remains wholly apparent that these elements could be added and would operate as has been described earlier.

Figures 24, 25:
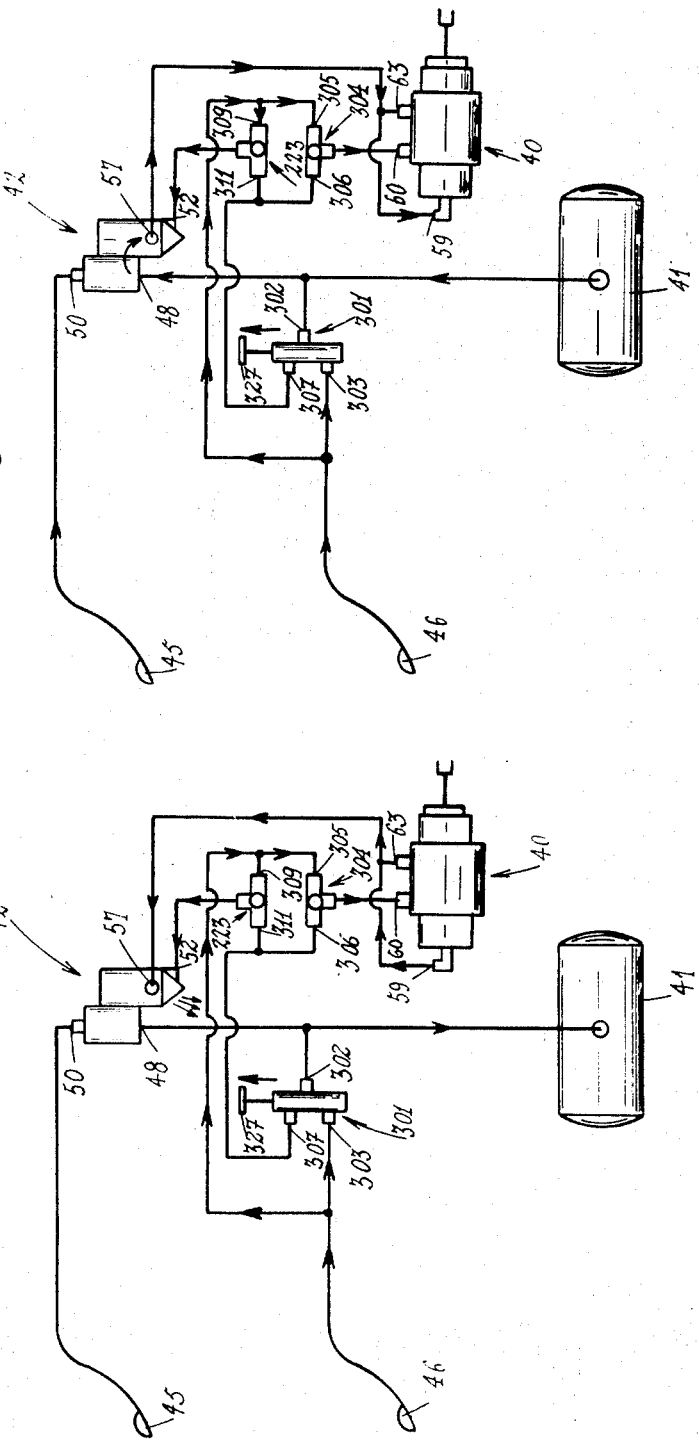
FIGS. 24 to 27 are diagrams of a fourth embodiment of the trailer-brake application and locking system in accordance with the invention, this system being shown in four different positions.

This fourth embodiment operates as follows:

When the trailer is coupled to a tractor vehicle (as shown in FIG. 24), the pressure of the automatic control circuit is transmitted through the coupling 46 to the auxiliary admission port 303 of the valve 301. Said valve is thus restored to the closed position and maintained therein.

The pressure of the automatic control circuit is also transmitted to the first admission ports 305, 309 of the double stop valves 304, 223. Inasmuch as the flow cross-sections of the valve 304 are distinctly larger than those of the valve 223, the pressure is first transmitted to the unlocking control inlet 60 before being transmitted to the second control inlet 52 of the emergency valve 42.

At the moment of coupling of the trailer the brakes of this latter are applied and locked. The air pressure which is exerted on the brake piston removes any danger of mechanical jamming or wedging of the locking elements on the brake control stem.

Furthermore, since the action of the unlocking control elements is predominant over the action of the locking control elements, the brakes are effectively unlocked.

After a period of time which is dependent on the flow cross-sections of the valve 223, the pressure of the automatic control circuit is transmitted to the second control inlet 52 of the emergency relay valve 42. Said relay valve then puts its outlet 57 into communication with the atmosphere. The pressure remains applied to the unlocking control inlet 60 while the braking control inlet 59 and locking control inlet 63 are connected to atmospheric pressure. The trailer brakes are consequently released automatically without any need to carry out any operation in the trailer. The system remains in the position of FIG. 24 during normal running on the road.

In order to apply the brakes while in motion (as shown in FIG. 25), the driver of the tractor vehicle applies an air pressure to the direct control circuit in the known manner while the automatic control circuit remains under pressure. The pressure is transmitted to the first control inlet 50 of the emergency relay valve which puts its outlet 57 into communication with the reservoir 41. Under these conditions, the three braking, locking and unlocking control inlets 59, 63 and 60 are put under pressure. Since the action of the unlocking control elements is preponderant, the trailer brakes are applied without being locked. When the driver of the tractor removes the pressure from the direct control circuit, the conditions of FIG. 24 are restored.

Figure 26:
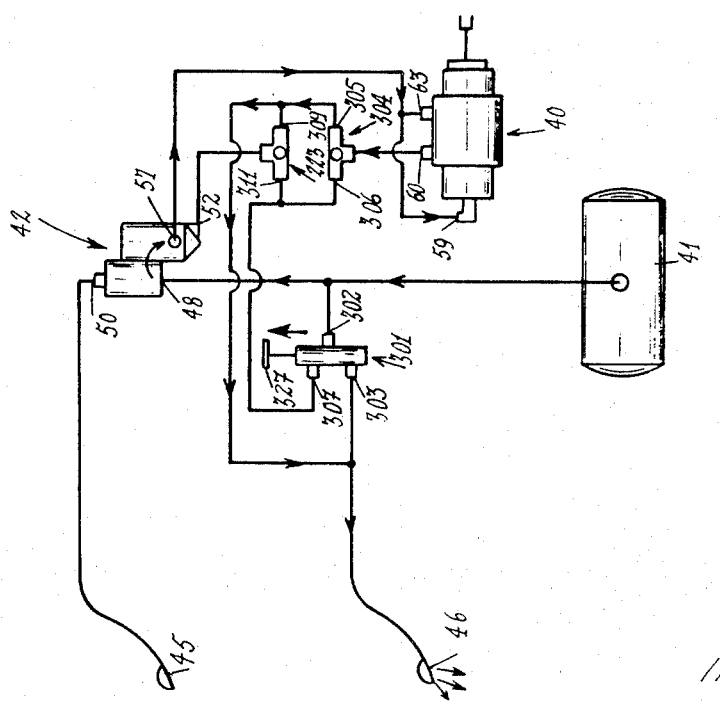

At the moment when the trailer is uncoupled (as shown in FIG. 26), the coupling pipe 46 is connected to atmospheric pressure. Since the valve 301 is still closed, all the admission ports of the stop valve 304 and 223 are also at atmospheric pressure. As a consequence, the air contained in the unlocking control elements is exhausted through the coupling pipe 46. Furthermore, inasmuch as the second control inlet 52 of the emergency relay valve is also connected to the atmosphere, the reservoir 41 is connected to the braking control inlet 59 and locking control inlet 63. The trailer brakes are applied and then locked.

It is apparent that the same result is obtained in the event of accidental failure of the trailer coupling or in the event that the trailer is coupled and stationary and the tractor driver connects the automatic control circuit to the the atmosphere by actuating the locking control box within the tractor, for example.

Figure 27:
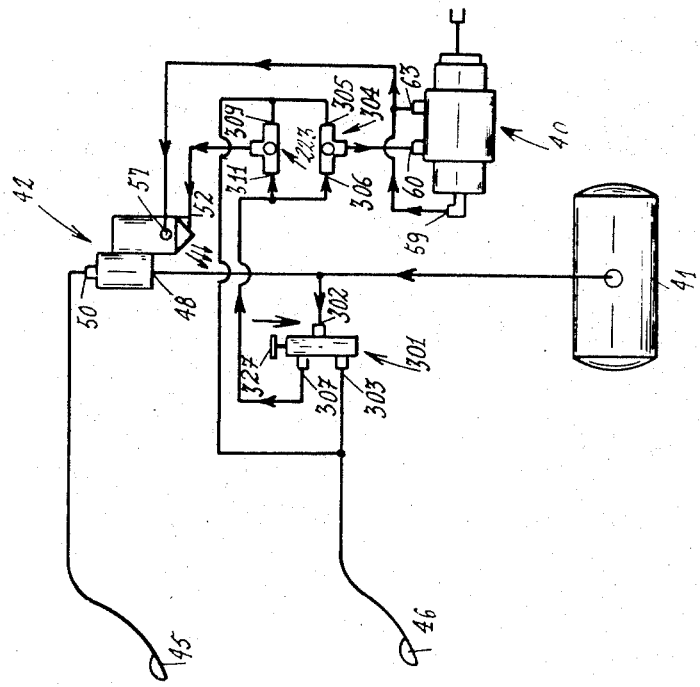

Should it be desired to unlock and release the brakes when the trailer is uncoupled in order to move this latter to a different position, for example, the valve 301 is moved to the open position by means of the knob 327 (shown in FIG. 27). The pressure of the reservoir 41 is then transmitted first to the unlocking control inlet 60 via the valve 304 and then, after a given time interval, to the second control inlet 52 of the emergency relay valve via the valve 223. Unlocking followed by release of the trailer brakes are then obtained as has already been explained with reference to FIG. 24. The brakes can be applied and locked again by returning the valve 301 to the closed position (as shown in FIG. 26).

As must be clearly understood, the invention is not limited to the embodiments hereinbefore described and any number of alternative forms of embodiment can accordingly be contemplated without thereby departing either from the scope or the spirit of this invention.

What we claim is:

1. A compressed-air braking and locking system for trailers or semitrailers which comprises at least one brake cylinder, air-actuated elements for locking the brakes comprising a locking control inlet and an unlocking control inlet, an emergency relay valve having an outlet connected to the brake cylinder and to the locking elements, a feed inlet connected to a compressed-air reservoir and a first and a second control inlet, said relay valve being adapted to put its feed inlet into communication with its outlet when an air pressure is applied to the first control inlet or when the second control inlet is connected to atmospheric pressure, the system being further provided with a first and a second coupling adapted to be connected respectively to a direct-control fluid circuit and to an automatic-control fluid circuit of a tractor vehicle, said system comprising a hand-operated valve unit having at least two positions and at least one two-way valve which are so arranged that in a first position the first and second control inlets of the emergency relay valve are put into communication respectively with the first and the second couplings in order to cut-off the communication between the reservoir and said first and second control inlets and that in a second position the reservoir is put into communication with the unlocking control inlet, the first and second couplings being at atmospheric pressure, the hand-operated valve unit having a third position and being so arranged that in said third position the reservoir is connected to the second control inlet of the emergency relay valve.

2. A system according to claim 1, wherein the brake cylinder has a main braking control inlet and an emergency braking control inlet, wherein the valve unit is so arranged that in the second position thereof the reservoir is put into communication with the first and the second control inlets of the emergency relay valve and that the two-way valve is a reversing valve having a control inlet connected to the second control inlet of the emergency relay valve, a feed inlet connected to the outlet of the emergency relay valve, a first outlet connected to the main braking control inlet and to the unlocking control inlet and a second outlet connected to the emergency braking control inlet and to the locking control inlet, said reversing valve being adapted in a manner known per se to put its feed inlet into communication respectively with its first or second outlet according as its control inlet is put under pressure or connected to the atmosphere.

3. A system according to claim 2, wherein the valve unit has a first and a second valve and a manually operated mechanism, the first valve having a first inlet connected to the first coupling and a second inlet connected to the reservoir, an outlet connected to the first control inlet of the emergency relay valve and a two-position movable shutter, the second valve having a first inlet connected to the second coupling, a second inlet connected to the reservoir, an outlet connected to the second control inlet of the emergency relay valve, and a three-position movable shutter and the actuating mechanism being so arranged that in a first position the first inlet of each valve is put into communication with the corresponding outlet and that in a second position the second inlet of each valve is put into communication with the corresponding outlet and that in a third position the first inlet of the first valve is put into communication with the corresponding outlet and the second inlet of the second valve is put into communication with the corresponding outlet.

4. A system according to claim 3, wherein each valve of the valve unit comprises a substantially cylindrical chamber into which open the first inlet which is disposed in the axis of the chamber and the outlet which is disposed in the axis of the chamber and the outlet which is disposed laterally, a bore which is located in coaxial relation with said chamber in the line of extension thereof and into which the second inlet opens laterally, and an obturator which is constituted by a plunger fitted with a restoring spring and having a diameter substantially equal to that of the bore and which has a portion of smaller cross-sectional area in the central portion thereof which defines an annular chamber within the bore.

5. A system according to claim 4, wherein the first valve of the valve unit comprises a stop which is adapted to limit the travel of the plunger so that said plunger should come into contact with the actuating mechanism only in the second and third positions.

6. A system according to claim 1, wherein the dimensions of the locking and unlocking control elements are such that the action of the unlocking control elements is preponderant over the action of the locking control elements when the same air pressure is applied simultaneously to the locking and unlocking control inlets, wherein the outlet of the emergency relay valve is connected to the braking control inlet of the brake cylinder and to the locking control inlet and the unlocking control inlet is connected to the first control inlet of the emergency relay valve, and wherein the valve unit is adapted to put the reservoir into communication with the two control inlets of the emergency relay valve in the second position thereof and with the second control inlet of said emergency relay valve in the third position thereof.

7. A system according to claim 6, wherein said system comprises a retarding valve which is mounted between the unlocking control inlet and the first control inlet of the emergency relay valve, said retarding valve being adapted to slow-down the air flow solely in one direction from the unlocking elements to the emergency relay valve.

8. A system according to claim 6, wherein the valve unit comprises two valves each having an inlet connected to the compressed-air reservoir, an outlet connected respectively to the first and to the second control inlets of the emergency relay valve and a movable shutter, and wherein said valve unit comprises a single manual-control mechanism for actuating said two shutters, said mechanism being provided with three positions corresponding respectively to closure of the two shutters, to opening of the shutter corresponding to the second control inlet of the emergency relay valve and to opening of the two shutters.

9. A system according to claim 6, wherein said system comprises two double stop valves whose outlets are connected respectively to the first and to the second control inlets of the emergency relay valve and having a first inlet connected respectively to the couplings of the direct-control and automatic-control circuits and a second inlet connected respectively to the valve outlets of the valve unit.

10. A system according to claim 7, wherein the retarding valve comprises a chamber into which open a first port connected to the unlocking control inlet and a second port connected to the first control inlet of the emergency relay valve, and a movable shutter pierced by a small-section passageway and adapted to be applied against the second port when the air flows from the locking elements towards the emergency relay valve.

11. A system according to claim 6, wherein said system comprises a pipe fitted with a stop valve connected on one side to the feed inlet of the emergency relay valve and on the other side to a flexible hose which is intended to be connected to an auxiliary compressed-air reservoir and wherein a check valve which prevents the flow of air towards the compressed-air reservoir is mounted in the pipe which is connected to the outlet of said reservoir.

12. A system according to claim 6, wherein said system comprises a pipe for connecting the second coupling aforesaid to the outlet of the compressed-air reservoir and wherein a check valve is placed in said pipe for preventing the flow of air from the compressed-air reservoir to said second coupling.

13. A system according to claim 1, wherein the dimensions of the locking and unlocking control elements are such that the action of the unlocking control elements is preponderant over the action of the locking control elements when the same air pressure is applied simultaneously to the locking and unlocking control inlets, wherein the brake-unlocking control inlet is connected to the outlet of a double stop valve having two inlets of which a first inlet is connected to the first control inlet of the emergency relay valve and wherein the valve-unit is adapted to put the compressed-air reservoir into communication simultaneously with the second inlet of the double stop valve and with the second control inlet of the emergency relay valve.

14. A system according to claim 13, wherein the second control inlet of the emergency relay valve is connected to the outlet of a second double stop valve having two inlets such that the first inlet is connected to the second coupling aforesaid and the second inlet is connected to the outlet of the valve unit.

15. A system according to claim 14, wherein the second inlet of the second stop valve has a flow cross-section of smaller area than either the first inlet of said valve or the inlets of the first double stop valve.

16. A system according to claim 14, wherein the valve unit has a cylindrical tubular body into which open an admission port connected to the compressed-air reservoir and a discharge port and within which is slidably mounted a movable obturator having two positions, said obturator being constituted by a cylindrical plunger having annular channels separated by annular seals and adapted to put the admission port into communication with the discharge port in the first position of the obturator and to isolate the admission port and put the discharge port into communication with the atmosphere in the second position of the obturator.

17. A system according to claim 1, wherein the dimensions of the locking and unlocking control elements are such that the action of the unlocking control elements is preponderant over the action of the locking control elements when the same air pressure is applied simultaneously to the locking and unlocking control inlets, wherein the valve unit has an inlet connected to the reservoir as well as an outlet and an obturator which is adapted to put said inlet into communication with said outlet, wherein the unlocking control inlet is connected to the outlet of a double stop valve such that a first valve inlet is connected to the second coupling aforesaid and the second inlet is connected to the outlet of the valve unit, wherein the second control inlet of the emergency relay valve is connected to the outlet of a second double stop valve such that a first valve inlet is connected to the second coupling aforesaid and the second inlet is connected to the outlet of the valve unit and wherein the two inlets of said second double stop valve have a cross-section of smaller area than the inlets of the first double stop valve.

18. A system according to claim 1, wherein the valve unit comprises means for returning the mechanism automatically from the second to the third position.

19. A system according to claim 1, wherein said hand-operated valve unit comprises a cylinder connected to the second coupling and a piston which is capable of moving within said cylinder and carries a stem so arranged as to return the mechanism to the first position thereof when said second coupling is put under pressure.

* * * * *